United States Patent [19]
Hill et al.

[11] Patent Number: 5,738,754
[45] Date of Patent: Apr. 14, 1998

[54] LAMINATION EQUIPMENT

[75] Inventors: Lawrence Alexander Hill, Rochester; Leon Richard Hale, Bergen; Robert Seth Sherwin, Hilton, all of N.Y.

[73] Assignee: Eastman Kodak Company, Rochester, N.Y.

[21] Appl. No.: 636,418

[22] Filed: Apr. 23, 1996

[51] Int. Cl.⁶ ........................................... B32B 31/04
[52] U.S. Cl. ..................... 156/555; 492/28; 492/48
[58] Field of Search ..................... 156/555, 583.1, 156/550; 492/28, 48; 100/327, 330, 155 R, 176

[56] References Cited

U.S. PATENT DOCUMENTS

| | | | |
|---|---|---|---|
| 2,088,470 | 7/1937 | Freedlander | 492/28 |
| 3,658,617 | 4/1972 | Fearnow et al. | 156/235 |
| 5,378,219 | 1/1995 | Hart et al. | 492/48 |
| 5,546,173 | 8/1996 | Hinotani et al. | 492/28 X |

*Primary Examiner*—James Sells
*Attorney, Agent, or Firm*—Clyde E. Bailey, Sr.

[57] ABSTRACT

Equipment for laminating webs has a pressure sensitive roller formed of a polymeric material layer resistant to wetting by molten polyethylene resin. A web transport surface for conveying the web during lamination is formed by the pressure sensitive layer and abutting solid, relatively thick polymeric material layers, preferably Teflon, which is secured against movement about the core and urged into substantial uniformity with the pressure sensitive layer by a locking ring assembly.

9 Claims, 3 Drawing Sheets

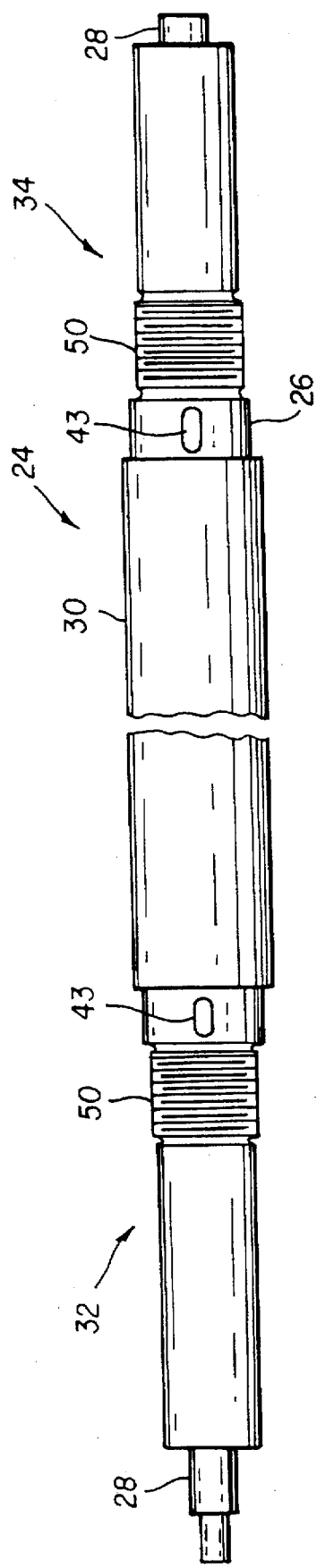
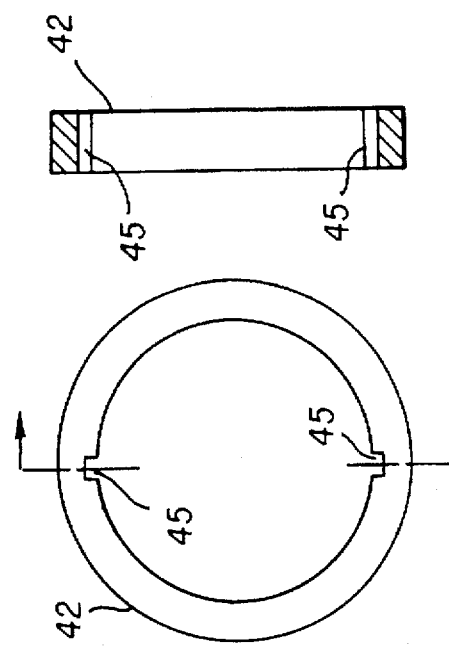

LAMINATION EQUIPMENT

FIELD OF THE INVENTION

The present invention relates to improved lamination equipment. More particularly, the invention is concerned with equipment for laminating webs which incorporates a coating transfer nip having a pressure sensitive roller with an improved durable non-stick surface for resisting adherence of the coating material.

BACKGROUND OF THE INVENTION

Conventional equipment for laminating webs, such as photographic film and paper, uses a molten polyethylene resin coating material which is applied to the web. The molten polyethylene resin coating material is fed from a source then through a coating nip onto the web. The coating nip is formed by a pressure sensitive roller and a chill roller which extends widthwise across the pressure sensitive roller. During coating, the pressure sensitive roller and chill roller are in pressure contact with one another. One problem associated with the present laminating coating equipment is that when the coating material is applied to the web, the end portions of the pressure sensitive roller not bearing the web is, of course, exposed to and attacked by overflow coating material. The overflow molten coating material generally will seep underneath the web riding on the roller and then form an adhesive-like layer that attaches the web to the roller. When this occurs, the web is not easily released from the pressure sensitive roller without having to shut the equipment down for cleaning and usually, roller replacement. Equipment shutdown is normally required because when the coating material, typically molten polyethylene resin attacks and is adhered to the pressure sensitive roller, the roller will not properly convey the web through the coating nip.

To prevent molten polyethylene resin from adhering to the pressure sensitive roller conveying the web, it is known in the art to wrap the ends of the roller with Teflon™ tape. It is generally known that Teflon™ tape applied on the end portions of the pressure sensitive roller will resist attacks and adherence by molten polyethylene resin, thus facilitating web release from the roller after it is coated. Hence, the operator would wrap several layers of tape around each end portion of the pressure sensitive roller so that the peripheral edges of the web will ride on a surface that promotes a quick release of the web after coating. However, due to the required high coating process pressure and heat, this tape (approximately 0.004 inches thick) has demonstrated a rather short life. Quite routinely, the tape tears away from the roller, or even more objectionable, deteriorates the quality of the product web. The failure of the tape often results in the equipment being shut down for a lengthy machine cleaning and grinding of the pressure roll. Thereafter, the roller would have to be re-taped with several layers of Teflon™ tape. Not unexpectedly, operators differ in the number of layers of tape that they apply on the pressure sensitive roller. Typically three (3) to four (4) wraps or layers of Teflon™ tape are used. A number of factors may effect the operators judgment as to layers of tape used and the wrapping technique employed. Primarily operator discretion is the predominant factor and the more experienced operator may be inclined to use more or less tape based on production run history. Since this is a known variable, it is difficult to achieve repeatable and reliable coating runs without the concern for coating material contamination.

Therefore, there persists a need for improved laminating equipment that provides a repeatable and reliable means for releasably conveying a coated web while producing high quality product.

SUMMARY OF THE INVENTION

It is, therefore, an object of the invention to provide laminating equipment that can coat a web with molten polyethylene resin material without the material adhering to the transfer nip roller.

Another object of the invention is to provide laminating equipment that can coat web without the need to frequently change rollers due to coating material sticking to the pressure roller.

It is a feature of the invention that the equipment has a pressure sensitive roller which forms a coating transfer nip when in contact with a chill roller and wherein the pressure sensitive roller has solid, thick polymeric material layers abutting against opposite ends of a pressure sensitive layer on the roller for resisting adherence of molten polyethylene resin overflowing thereon.

To solve one or more of the foregoing problems, there is provided, in one aspect of the invention, improved equipment for laminating webs. The equipment includes a pressure sensitive roller used in resin coating. The pressure sensitive roller is composed of a core having a main portion and first and second end portions bounding the main portion. A pressure sensitive material layer having a diameter ($d_1$) surrounds the core and extends widthwise along the main portion of the core between the first and second end portions. A solid, relatively thick polymeric material layer or sleeve is arranged abuttingly against opposite end portions of the pressure sensitive layer forming a generally uniform rotatable web transport surface. Consequently, the rotatable web transport surface formed by the abutting pressure sensitive layer and the solid polymeric material layer provide means for effectively conveying and then releasing the web without the equipment problems normally associated with the coating material wetting and adhering to the web transport surface. Furthermore, in this embodiment means is provided for securing the polymeric material layers or sleeves on the core against axial movement along the core.

It is, therefore, an advantageous effect of the invention that it provides improved lamination equipment having a more robust web transport surface at the interface of pressure sensitive roller and molten polyethylene resin coating material. It is another advantage of the lamination equipment of the invention that a solid, relatively thick polymeric material layer or sleeve fixedly abutting against a pressure sensitive layer on the roller provides for longer roller life and subsequently less machine downtime. The lamination equipment of the invention also provides the advantage of eliminating operator variability associated with the prior art practice of winding tape onto the end portions of the pressure sensitive roller.

BRIEF DESCRIPTION OF THE DRAWINGS

The foregoing as well as other objects, features and advantages of this invention will become more apparent from the appended Figures, wherein like reference numerals denote like elements, and wherein:

FIG. 5 is a plan view of the complete pressure sensitive roller;

FIG. 6 is an end view of the polymeric material layer; and,

FIG. 7 is a section view along lines 7—7 of FIG. 6.

DETAILED DESCRIPTION OF THE DRAWINGS

Figure 1:
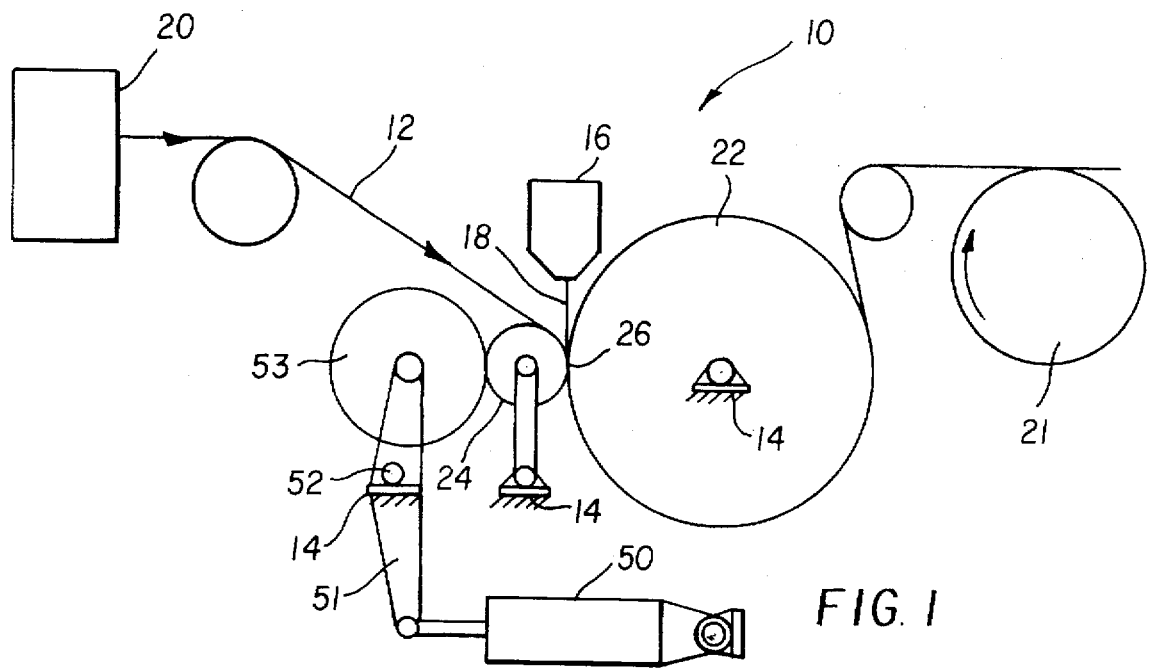
FIG. 1 is a side elevational view of the equipment of the invention.
Figure 2:
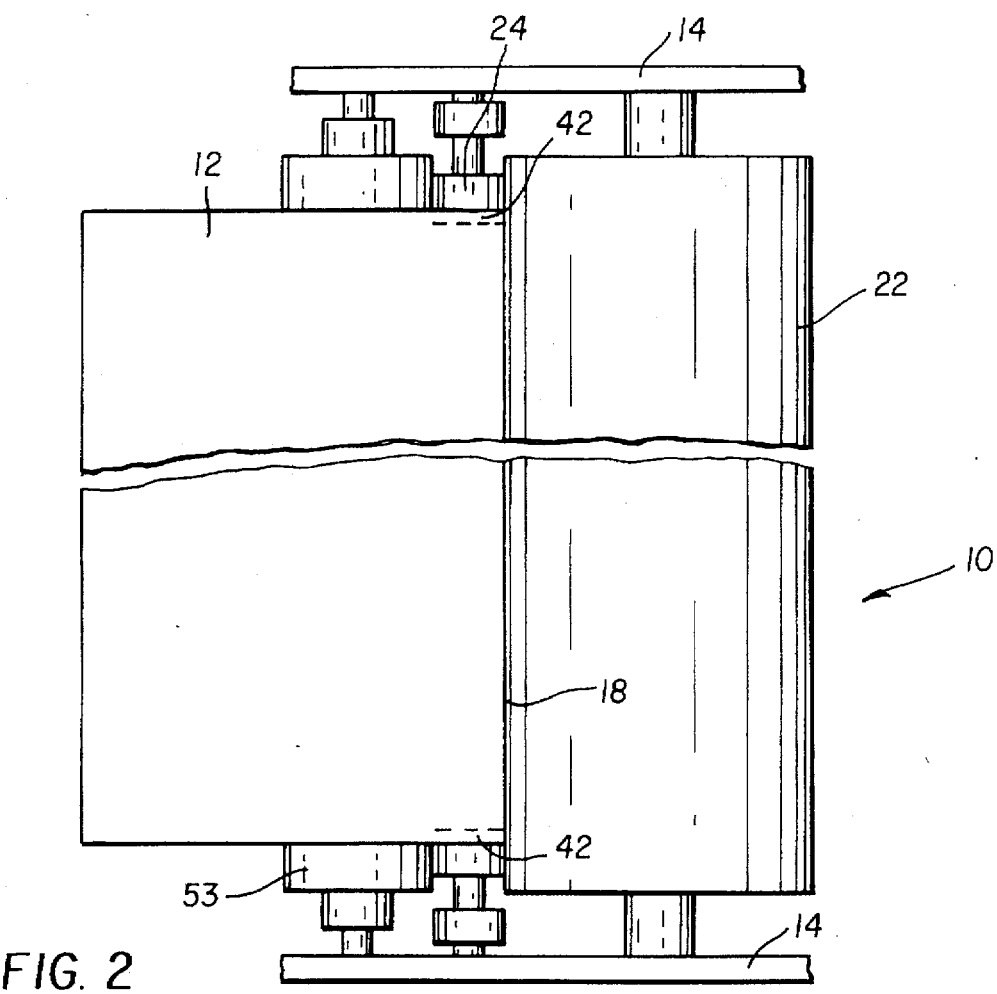
FIG. 2 is a top elevational view of the equipment showing the coating transfer nip rollers.

Turning first to FIGS. 1 and 2, the improved lamination equipment 10 of the invention is illustrated. According to FIG. 1, equipment 10 for coating web 12, such as photographic paper or film comprises a frame 14 supporting a source 16 of coating material 18 used for laminating the photographic paper or film. In our applications, preferably a molten polyethylene resin coating is used for laminating the web, although other resins may be also used with similar satisfactory results. The web is supplied from a source 20 which includes preferably a spindle roller which accommodates the fresh input web 12. In FIGS. 1–2, means 21 operably connected to frame 14 is provided for advancing the web 12 from the source 20 through the coating transfer nip 26 thereby producing a coated web. The arrows in FIG. 1 indicate the direction of travel of web 12 through equipment 10. A first roller, or chill roller 22, is rotatably mounted in frame 14. First roller 22, which is rotatably mounted in the frame 14, comprises a metallic material, preferably steel, for contacting a second roller 24, as described below.

As depicted in FIGS. 1 & 2, a second roller 24 is rotatably mounted in the frame 14 for engageably contacting the first roller 22. Importantly, second roller 24 provides a transport surface for the web 12 being coated with the molten polyethylene resin. When the first and second rollers 22,24 are in engageable contact, a coating transfer nip 26 is formed therebetween. Second roller 24 is mounted on a pivot unit (not shown) which enables second roller 24 to pivot in and out of engagement with the first roller 22 and backing roller 53. Moreover, a backing roller 53 is used to apply uniform pressure against the pressure sensitive roller 24 so that corresponding uniform pressure can be applied against the web 12 and first roller 22 in the coating transfer nip 26. Backing roller 53 is mounted on a linkage system (not shown) for movement by either a pneumatic or hydraulic cylinder system 50. We prefer using a pneumatic cylinder system for producing the desired movements of the backing roller 53 into and away from second roller 24. According to our experience, backing roller 53 is capable of developing a force in the range of about 5.0 lb. to 50,000 lb. against the second roller 24. In our experience, the desired level of force is a function of the type of product being coated.

Figure 3:
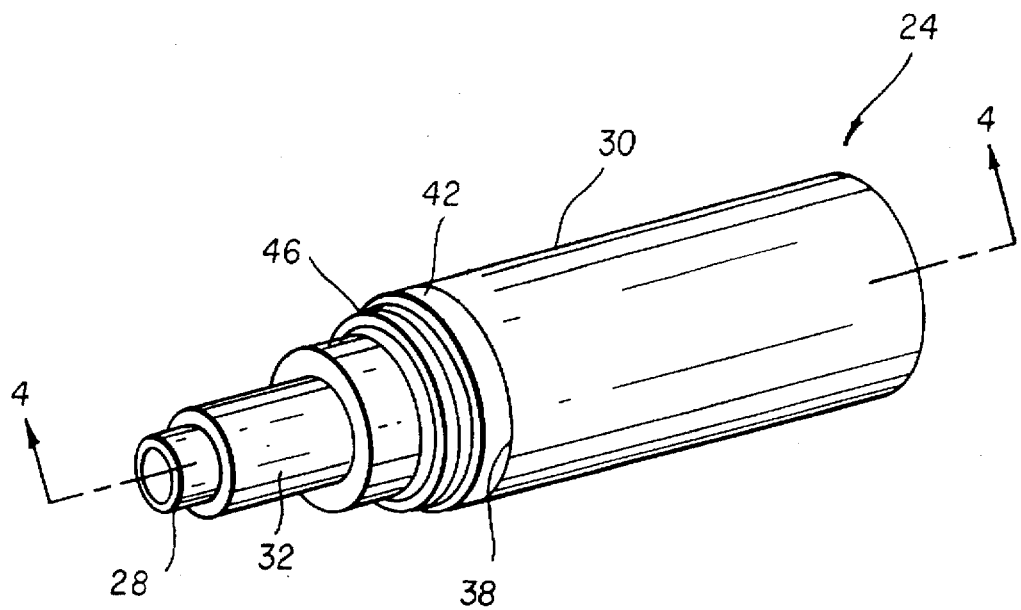
FIG. 3 is a perspective view of the pressure sensitive roller, showing only one end portion.
Figure 4:
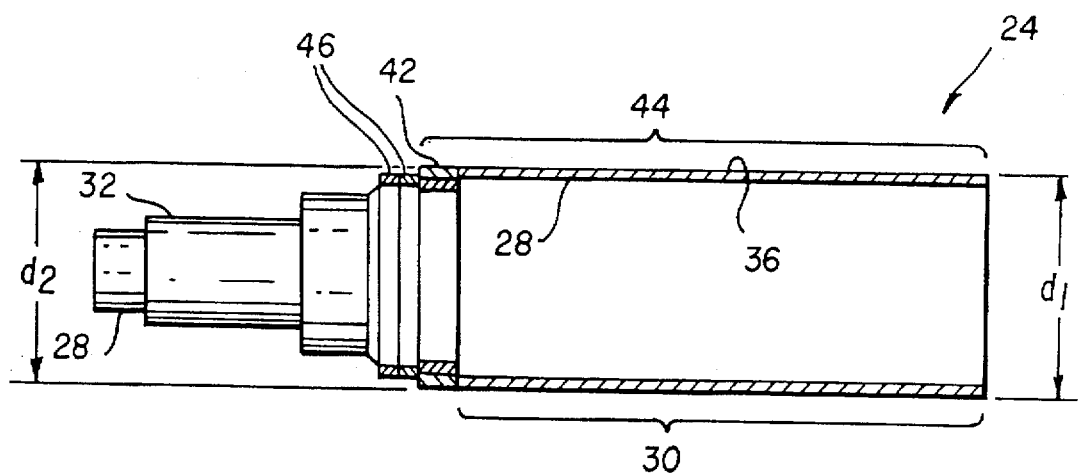
FIG. 4 is a section view along line 4—4 of FIG. 3.

According to FIG. 5, it is important to the invention that the second roller 24 comprises a core 28 having a main portion 30 and first and second end portions 32,34. Referring to FIGS. 3–4, a pressure sensitive layer 36 having a diameter ($d_1$) surrounds the core 28. Pressure sensitive layer 36 alternately referred to as roll cover material extends widthwise along the main portion 30 of the core 28 between the first and second end portions 32,34. A suitable roll cover material preferred by the inventors is Hypalon™ manufactured by the DuPont Corporation of Beaumont, Tex. and supplied by American Roller Inc. of Cleveland, Ohio. Other materials that may be used with equally satisfactory results include a general purpose silicon.

As illustrated in FIGS. 3–5, second roller 24, more importantly, comprises a solid, relatively thick polymeric material layer or sleeve 42 arranged on the first and second end portions 32,34 of core 28 abuttingly against opposite ends of pressure sensitive layer 36 (only one end shown in details). In one embodiment, sleeve 42 may be arranged on the core 28 abuttingly against the roll cover material 36. Alternatively, sleeve 42, preferably is arranged along opposing end portions of the second roller 24 abuttingly against the roll cover material layer 36. Preferably, the polymeric material layer 42 is machined when positioned on the core 28 so that its diameter ($d_2$) is somewhat less than the diameter ($d_1$) of the roll cover material 36 which is also slightly machined. Machining of both the roll cover material and polymeric material layers 36,42 so that there is a slight undercut portion 41 between the two layers (FIG. 3) is believed to provide a generally robust surface for conveying web in equipment 10 of the invention. Skilled artisans will appreciate that arcurate groovings (not shown) may be formed in opposite end portions of the roll cover material 36 of second roller 24 for receiving a polymeric material layer 42 as described herein. In this configuration, it would be important that the edges of the web 12 on the web transfer surface at least partially ride on the polymeric material layer 42 to protect the second roller 24 from wetting by the molten polyethylene resin used in equipment 10.

It is important to the invention that the solid polymeric material layer 42 on second roller 24 have a thickness in the range of about 0.75 inches to about 1.0 inch, while 1.0 inch is the most preferred thickness. The thickness of the polymeric material layer 42 is important to the integrity of the web transport surface formed by the roll cover material 36 and the abutting polymeric material layer or sleeve 42. Moreover, the thickness of the polymeric material layer 42 on core 28 of second roller 24 imparts durability to the web transport surface as well as eliminates the need for frequent maintenance of second roller 24. More importantly to the equipment 10 of the invention, the polymeric material layer or sleeve, 42, has been found to resist attacks and adherence by overflow molten polyethylene resin coating. In a typical resin coating environment, such as the instant lamination equipment 10, a curtain coat of molten polyethylene resin is deposited onto the conveyed web being coated and invariably the coating material will deposit onto exposed portions of the second roller 24. Without the solid, relatively thick polymeric material layers or sleeves 42 of the invention, the deposition of coating material on the web transport surface of second roller 24 has been known to cause substantial production quality and equipment problems. Thus, this latter property of the second roller 24 employed in equipment 10 of the invention is deemed related specifically to the use of preferably solid, relatively thick Teflon™ sleeves 42, as described further below. Consequently, the second roller 24 when used in the lamination equipment 10 of the invention provides a more robust web transport surface having a longer roller life.

Furthermore, in FIGS. 3 & 4, the polymeric material layer or sleeve, 42, preferably comprising a fully fluorinated copolymer of hexafluoropropene and tetrafluoroethylene, such as Teflon™, is keyed to the second roller 24 and retained axially by threaded nuts, as described below. To reduce pressure on the polymeric material layer or sleeve 42 on both end portions of the core 28, the polymeric layers 42 are machined to a diameter ($d_2$). As indicated, it is preferred that diameter ($d_2$) is somewhat smaller than diameter ($d_1$) of the roll cover material 36.

As depicted in FIGS. 5–7, corresponding engageable notched portions defining a first key-way 43 in the core 28 of second roller 24 and a second key-way 45 in the inside diameter of the polymeric material layer 42 are formed to provide more stability of the web transport surface. In this way, a key (not shown) can be slid into locking engagement with the first and second key-ways 43, 45 thereby restricting radial movements of the polymeric material layer 42 on the core 28.

Referring again to FIGS. 3-4, also important to the equipment 10 of the invention, second roller 24, moreover, includes means 46 for securing the polymeric material layer or sleeve 42 on each first and second end portion against axial movement along the core 28. The preferred means for securing includes at least one threaded locking ring assembly that is threadably mounted on corresponding threaded portions 50 of second roller 24, as shown in FIG. 5. In our invention, means, or the locking ring assembly, 46, for securing is urged against a peripheral edge (not shown) of the solid polymeric material layer 42 so as to correspondingly urge the polymeric material layer 42 into substantial uniformity with the roll cover material layer 36. We prefer using a pair of identical locking ring assemblies 46 on both end portions 32,34 of the second roller 24 to ensure that the sleeve 42 is securely held in place on the core 28. Therefore, both polymeric material layers or sleeves 42 positioned on either end portions of the core 28 are securely locked against further axial movement by locking ring assemblies 46. Those skilled in the art will appreciate that there are other means of securing the sleeves to the core include using screws or threadable sleeves, or gluing.

Parts List
10 ... lamination equipment
12 ... web
14 ... frame
16 ... source of coating material
18 ... coating material
20 ... source of web
21 ... means for advancing the web 12
22 ... first roller or chill roller
24 ... second roller or pressure sensitive roller
26 ... coating transfer nip or sleeve
28 ... core of second roller
30 ... main portion of second roller
32,34 first and second end portions of second roller 24
36 ... roll cover material
41 ... undercut portion
42 ... polymeric material layer or sleeve
43 ... first key-way
44 ... uniform rotatable surface
45 ... second key-way
46 ... means for securing the polymeric material layer 42 or locking ring assembly
50 ... threaded portion of roller 28
53 ... backing roller While the invention has been described with a certain degree of particularity, it is manifest that many changes may be made in the details of the construction and the arrangement of components without departing from the spirit and scope of the disclosure. It is understood that the invention is not limited to the embodiments set forth herein for purposes of exemplification, but is to be limited only by the scope of the attached claim or claims, including the full range of equivalency to which each element thereof is entitled.

We claim:

1. Improved laminating equipment for coating web, comprising:

a source of molten polyethylene resin coating;

a source of web;

a frame;

a first roller rotatably mounted in said frame;

a second roller mounted for rotation in said frame for engageably contacting the first roller, the first and second rollers when engaged forming a coating transfer nip therebetween, said second roller further comprising:

a core having a main portion and first and second end portions;

a roll cover material having a diameter ($d_1$) surrounding said core, said roll cover material extending widthwise along said main portion of said core between said first and second end portions;

a solid, relatively thick polymeric material layer arranged on said core abuttingly against said roll cover material forming a generally uniform rotatable web transfer surface for conveying said web; and;

means for securing said polymeric material layer against axial movement along the core, said means for securing being urged against opposite edges of said solid polymeric layer so as to correspondingly urge said polymeric material layer into substantial uniformity with said roll cover material; and, means for advancing said web from said source through said coating transfer nip for producing a coated web.

2. The equipment recited in claim 1, wherein said polymeric material layer comprises a material resistant to wetting by a molten polyethylene resin.

3. The equipment recited in claim 2, wherein said polymeric material layer comprises a fully fluorinated copolymer of hexafluoropropene and tetrafluoroethylene.

4. The equipment recited in claim 1, wherein said polymeric material layer has a width of about 1.5 inches.

5. The equipment recited in claim 1, wherein said means for securing said polymeric material layer comprises a threaded locking ring assembly adapted for fitting a correspondingly threaded portion of said core, said threaded locking ring assembly being snugly abutted against opposite end edges of said polymeric material layer so as to prevent axial movement of said polymeric material layer about said core.

6. The equipment recited in claim 1, wherein said core and said polymeric material layer comprises a notched portion forming first and second key-ways, respectively, for receiving a key-like member, said second key-way being formed in an inside diameter of said polymeric material layer for lockingly engaging with said key like member said first key-way and thereby securing said polymeric material layer against radial movement about the core.

7. The equipment recited in claim 1 wherein first and second collar portions are arranged on said first and second end portions, respectively, of said core, abuttingly against said locking ring assembly.

8. The equipment recited in claim 3, wherein said polymeric material layer has a thickness of about 0.75 inches (1.9 cm) to about 1.0 inch (2.54 cm).

9. The equipment recited in claim 8, wherein said polymeric material layer has a thickness of 1.0 inch (2.54 cm).

* * * * *